(12) United States Patent
Barclay et al.

(10) Patent No.: US 6,412,827 B1
(45) Date of Patent: Jul. 2, 2002

(54) LOCKABLE QUICK CONNECT/ DISCONNECT COUPLING

(75) Inventors: Denis Barclay, Point Claire; Paul Major, Dorval; Elie Banon, St. Laurent, all of (CA)

(73) Assignee: Ritepro Corporation, Montreal (CA)

( * ) Notice: Subject to any disclaimer, the term of this patent is extended or adjusted under 35 U.S.C. 154(b) by 0 days.

(21) Appl. No.: 09/467,769

(22) Filed: Dec. 20, 1999

(30) Foreign Application Priority Data

Jan. 28, 1999 (GB) ................................ 9901768

(51) Int. Cl.[7] .................................... F16L 37/00
(52) U.S. Cl. ............................. 285/312; 285/82
(58) Field of Search ......................... 285/81, 82, 87, 285/88, 312

(56) References Cited

U.S. PATENT DOCUMENTS

| | | | |
|---|---|---|---|
| 3,439,942 A | | 4/1969 | Moore et al. |
| 3,445,127 A | * | 5/1969 | Clarke ........................ 312/88 |
| 3,976,313 A | | 8/1976 | Lauffenberger et al. |
| 4,295,670 A | | 10/1981 | Goodall et al. |
| 4,618,171 A | | 10/1986 | Fahl |
| 4,647,075 A | | 3/1987 | Vargo |
| 4,691,942 A | * | 9/1987 | Ford ........................ 285/312 X |
| 4,871,195 A | | 10/1989 | Parrish |
| 5,005,876 A | | 4/1991 | Fahl |
| 5,435,604 A | * | 7/1995 | Chen ........................ 285/312 X |
| 5,944,362 A | * | 8/1999 | Harle ........................ 285/87 X |
| 5,947,530 A | * | 9/1999 | Harle ........................ 285/312 X |
| 6,089,619 A | * | 7/2000 | Goda ........................ 285/312 |

\* cited by examiner

Primary Examiner—Lynne H. Browne
Assistant Examiner—David E. Bouhna
(74) Attorney, Agent, or Firm—Robert A. Wilkes

(57) ABSTRACT

A QCD coupling in which a rotating subsidiary locking means is provided which is both positive in its locking action, locks all of the levers simultaneously, and does not involve any small or readily losable parts, as the subsidiary locking means is itself securely attached to the coupler part of the QCD coupling. As all of the levers are locked simultaneously, the subsidiary locking means cannot be locked unless all of the levers are in the fully "locked" position.

14 Claims, 3 Drawing Sheets

LOCKABLE QUICK CONNECT/ DISCONNECT COUPLING

BACKGROUND OF THE INVENTION

1. Field of the Invention

This invention relates to so-called quick connect/ disconnect couplings. More particularly, this invention relates to a quick connect/disconnect coupling which includes a positive locking means which prevents inadvertent disconnection of the coupling.

Couplings of this type, in various sizes, are commonly used as connections for fluid conduits used for transferring liquids in bulk from one location to another. Quick connect/ disconnect couplings, or QCD couplings, are in widespread use for conduits such as pipes and hoses commonly having internal diameters of from about 1.25 cm to at least 20 cm; in theory there is no upper size limitation. The QCD coupling comprises two essential parts, which are a coupler and an adapter. The coupler is usually attached to, or mounted into the end of, a flexible conduit, such as a hose. The adapter is usually mounted onto a relatively fixed conduit, such as the end of a metal pipe, or a manifold attached to a storage tank or the like. These arrangements can be reversed, so that for example the adapter can also be mounted into the end of a flexible conduit such as a hose. Generally the two conduits are of about the same size in terms of internal bore; it is also known to construct QCD couplers to join two conduits which are of different sizes.

The male adapter includes an arcuate groove around its outer substantially cylindrical face adjacent its sealing end, which is inserted into the female coupler bore. The coupler also includes at least two locking levers, which include cam means extending through slots into the bore of the coupler. To connect the QCD coupling, the adapter is entered into the bore of the coupler with the levers placed in the "open" position. The levers are then moved from the "open" position to the "locked" position, thus forcing the cams into engagement with the arcuate groove. Movement of the levers both locks the adapter into the coupler, and urges the adapter into engagement with a seal bedded onto a suitably located face in the coupler, to provide a positively locked and liquid tight connection between the two conduits. The seal is commonly fabricated from an elastomeric material. The QCD coupling is separated by moving the levers from the "locked" position to the "open" position, thus freeing the adapter from the coupler and permitting separation of the two parts of the coupling.

2. Discussion of Related Art

Although QCD couplings of this general type have been in commercial use for many years, they still suffer from one important disadvantage. Even though some force is required to move the locking levers from the "locked" to the "open" position, especially if fluid carrying conduits joined by a coupling are under pressure, in the absence of any other protective device, the risk exists that one, or more, of the levers may be inadvertently moved from the "locked" position sufficiently far toward the "open" position to result in either leakage of fluid from the coupling, or even separation of the coupling. It is therefore necessary that significant care be exercised when QCD couplings are used. This is not always possible. Several attempts have been made to overcome this difficulty; examples are to be found in Moore, U.S. Pat. No. 3,439,942; Lauffenberger, U.S. Pat. No. 3,976,313; Goodall et all, U.S. Pat. No. 4,295,670; Fahl, U.S. Pat. No. 4,618,171 and U.S. Pat. No. 5,005,876; Vargo, U.S. Pat. No. 4,647,075; and Parrish, U.S. Pat. No. 4,871,195. In these prior patents, three techniques have been used.

The first is to provide a subsidiary locking means which is intended to prevent inadvertent movement of each lever. This comprises a member attached to the coupler that must be deflected in order to move the lever from the "locked" position, and is automatically engaged when the lever is moved from the "open" to the "locked" position. Examples of this approach are Moore U.S. Pat. No. 3,439,942; Lauffenberger, U.S. Pat. No. 3,976,313 and Vargo, U.S. Pat. No. 4,647,075.

The second is to modify the lever itself, so that it is more difficult to move it from the "locked" position. Examples of this are Fahl, U.S. Pat. Nos. 4,618,171 and 5,005,876.

The third is to provide an additional positive locking system, which must be separately engaged on each lever, after each lever has been moved to the "locked" position, and separately disengaged from each lever before each lever can be moved from the "locked" position. Examples of this are Goodall et all, U.S. Pat. No. 4,295,670; and Parrish, U.S. Pat. No. 4,871,195.

These known modified QCD couplings although being less prone to inadvertent lever movement still do not overcome the difficulty. The subsidiary locking means, such as a bent plate, spring wire loop, or spring-loaded ball detent (Moore, Lauffenberger and Vargo) is not difficult to defeat, as also is a modified lever (Fahl). The additional locking systems although far more difficult to defeat, up to a point defeat the "quick" attribute of QCD couplings, as each lever has to be separately locked or unlocked each time the coupling is used. Furthermore, these devices require the use of additional small and easily lost items, such a small spring cotterpins (Goodall et all, and Parrish). These devices are thus not easily used by a worker wearing industrial gloves, and once the small item is lost, the subsidiary locking means is useless until it be replaced.

SUMMARY OF THE INVENTION

This invention seeks to provide a QCD coupling of this general type, in which a subsidiary locking means is provided which is both positive in its locking action, locks all of the levers simultaneously, and does not involve any small or readily losable parts, as the subsidiary locking means is itself securely attached to the coupler part of the QCD coupling. As an additional benefit, as all of the levers are locked simultaneously, the subsidiary locking means cannot be locked unless all of the levers are in the fully "locked" position.

The subsidiary locking means of this invention comprises a cap which is rotatably secured to the coupler body, adjacent to the end of the bore entered by the adapter. The cap can be rotated between an "open" and a "closed" position; detent means are provided between the cap and the coupler to retain it in the "closed" position, and preferably also to hold it in the "open" position. The skirt of the cap includes slots, which are in registration with the levers, as they are set at the same spacing around the skirt as the levers are set around the coupler body. When the cap is in its "open" position, the levers can be moved to their "open" positions by entering into the slots in the cap skirt, thus permitting the QCD coupling to be engaged and disengaged as desired. After the levers have been moved to their "closed" position, the cap can be rotated to its "closed" position. It is now impossible to move the levers to their "open" position, as the skirt of the cap effectively prevents any substantial movement. The QCD coupling modified according to this invention can only be disengaged when the cap has been rotated to its "open" position.

Since the clearance between the cap skirt and the levers when both are in their fully "locked" position is minimal, and needs to be only enough to ensure free rotation of the cap, the subsidiary lock of this invention provides the additional safety feature that the QCD coupling cannot be locked unless all of the levers are fully in their "locked" positions, which requires that the adapter is also fully engaged into the coupling and urged against the coupler seal.

Thus in its broadest embodiment, this invention seeks to provide a female coupler for a quick connect/disconnect coupling comprising in combination:

- a female coupler comprising a body member having a bore for receiving the outer end portion of the male adapter, and a seal constructed and arranged to seal with the sealing surface of the male adapter;
- a lever locking mechanism carried by the female coupler comprising a plurality of locking levers pivotally mounted onto the outside of the female coupler, each lever being rotatable between a "closed" position, and an "open position; a cam member attached to or forming part of each lever extendable on rotation of each lever about its pivot toward its "closed" position through a corresponding slot in the female coupler body into the bore of the female coupler, the cam members being constructed and arranged to engage with a cooperating arcuate groove on a male adapter constructed and arranged to be entered into the bore of the female coupler on rotation of the levers toward their "closed" position;
- a cap member rotatably attached to the female coupler adjacent the opening of the bore, the cap member having a skirt which extends along the outside of the female coupling to a point adjacent the lever pivots, and being rotatable on the female coupling between a "closed" position, and an "open" position;
- a plurality of slots in the skirt of the cap in registration with the levers; and
- at least one detent means interposed between the cap and the female coupler constructed and arranged to retain the cap in its "closed" position;

wherein when the cap is in its "open" position the levers can be moved into the cap slots to their "open" positions, and when all the levers are rotated to their "closed" positions, the cap can be rotated about the female coupling to its "closed" position.

Preferably, the detent means is constructed and arranged to retain the cap in both its "open" and its "closed" position.

Preferably, the detent means comprises at least one spring loaded ball carried by the coupler, which enters into a suitably located depression in the cap when the cap is rotated to its "closed" position. More preferably, the detent means comprises at least one spring loaded ball carried by the coupler, which enters into a first suitably located depression in the cap when the cap is rotated to its "closed" position, and into a second suitably located depression when the cap is rotated to its "open" position.

Preferably, the cap is rotatably retained on the female coupler by means of a wire inserted into cooperating grooves on the cap and on the coupler body.

BRIEF DESCRIPTION OF THE DRAWINGS one embodiment of the invention will now be described in more detail reference to the drawings in which.

DETAILED DESCRIPTION OF THE INVENTION

In these Figures like parts are given the same numbers.

Figure 1:
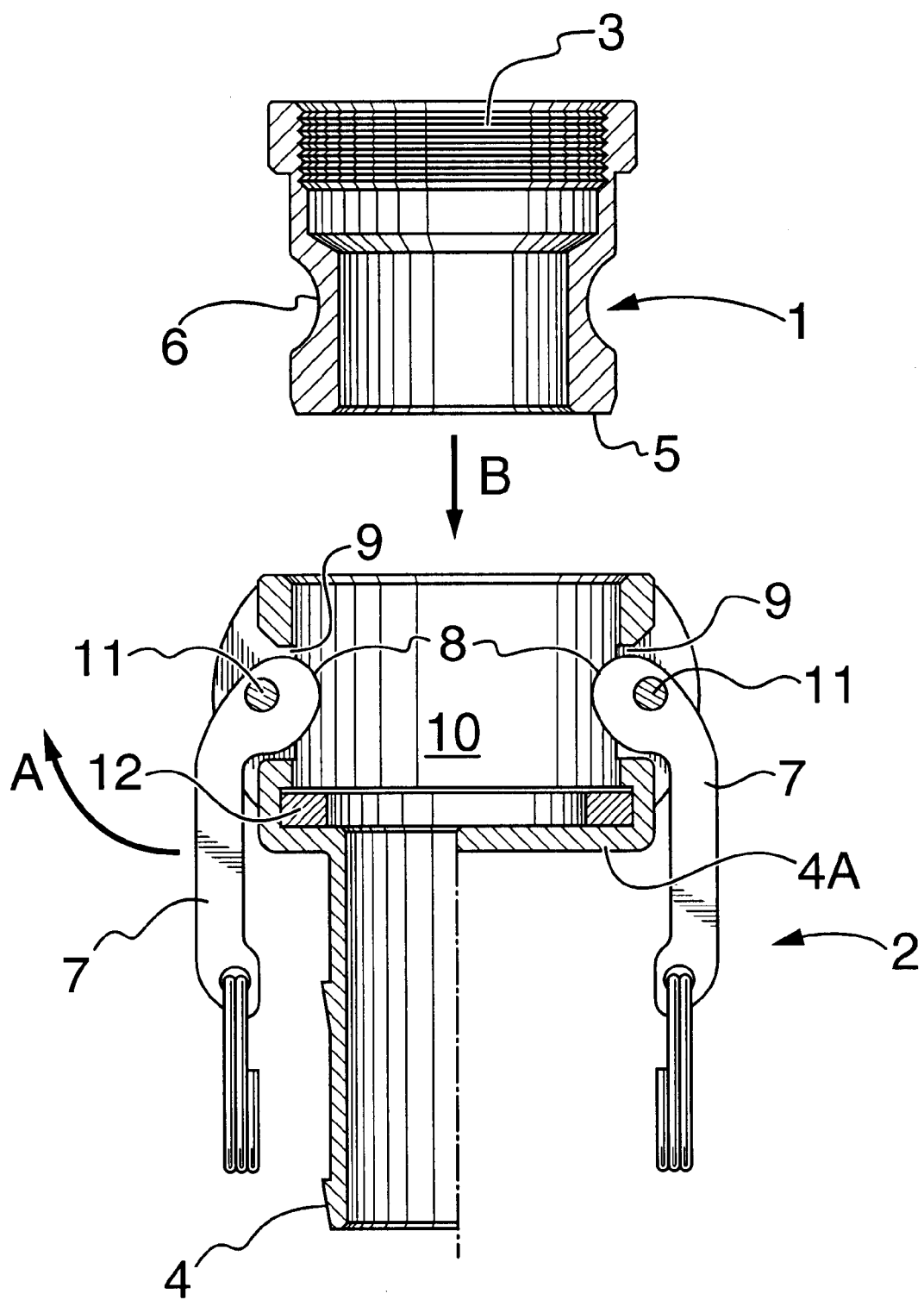
FIG. 1 shows in cross section a separated conventional prior art coupling.

Referring first to FIG. 1, the conventional coupling shown comprises a male adapter 1 and a female coupler 2. In this couple, the adapter is provided with a threaded connection as at 3, and the coupler with a hose connection, as at 4. As noted above, other combinations are commonly used. The adapter includes a sealing face 5, and a peripheral arcuate groove 6. As shown, the levers 7 are in the "locked" position, so that the cams 8, which in this instance are made integral with the lever 7 as is the common practise, extend through the slots 9 into the bore 10 of the female coupler. To close the coupling, the levers are moved to their "open" position by rotation in the direction A about the pivot pins 11. The adapter 1 can then be entered into the bore 10 of the coupler in the direction B. Rotation of the levers in the reverse of direction A engages the cams 8 into the arcuate groove 6, thus both locking the adapter 1 into the bore 10, and urging the sealing face 5 into sealing contact with the sealing means 12. This basic form of QCD coupling is widely used in many applications, and is manufactured to dimensional standards which ensure interchangeability between couplers and adapters. The cam face and the peripheral arcuate groove are also commonly shaped so that when the coupling is carrying a fluid under pressure, which will tend to urge the two parts of the coupling apart, the effects of pressure tend to urge the cams into better engagement with the arcuate groove.

Figure 2:
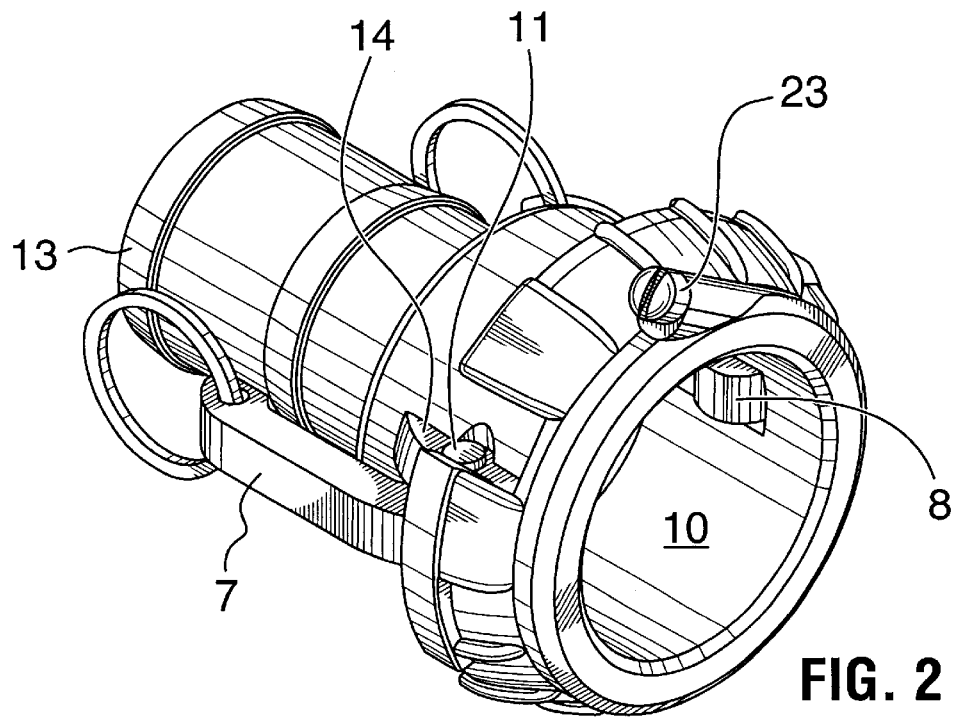
FIG. 2 shows a perspective view of a female coupler according to this invention.
Figure 3:
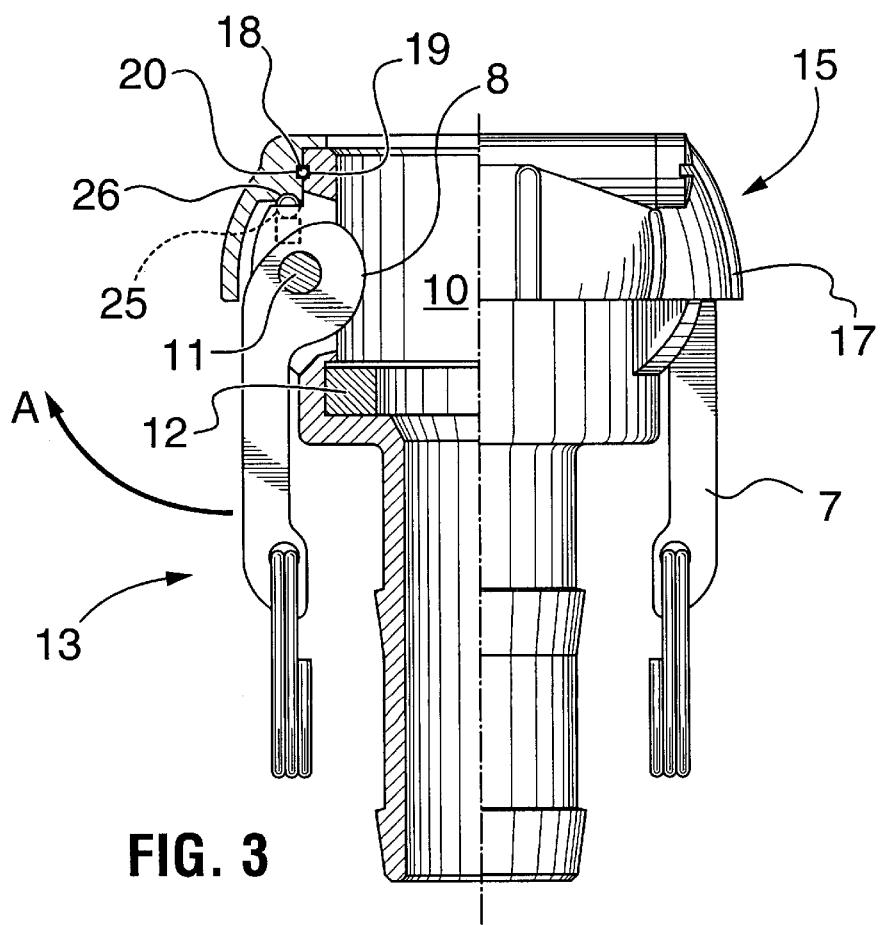
FIG. 3 shows a part cross section of FIG. 2.
Figure 4:
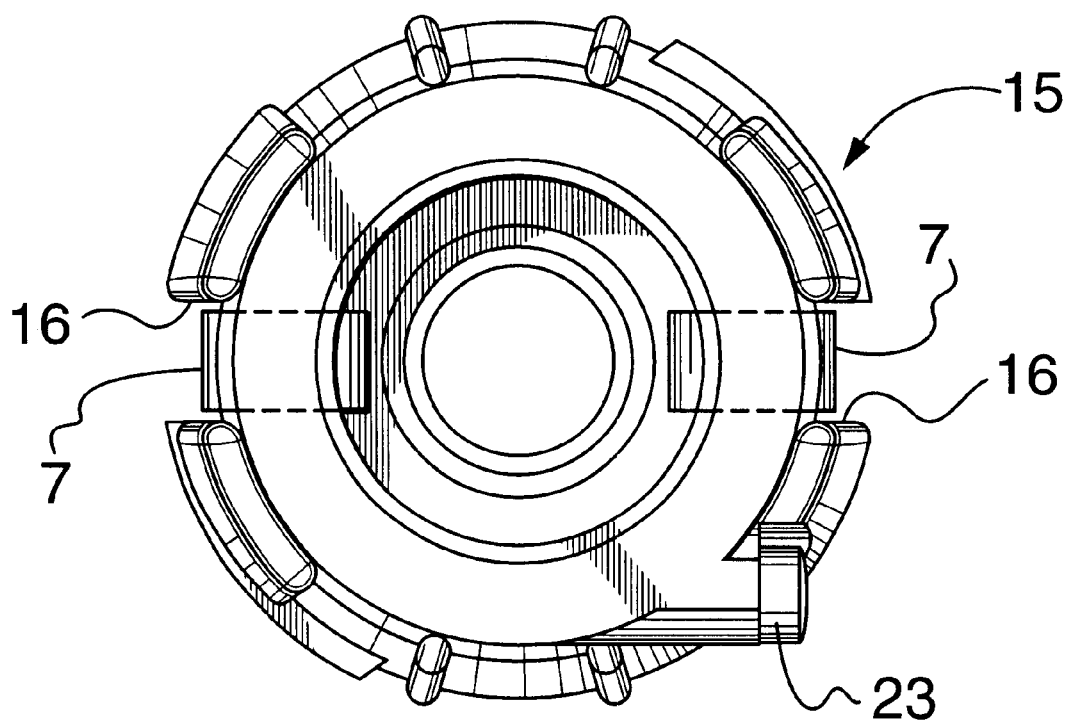
FIG. 4 shows a view of the coupler of FIG. 2 on the axis of the bore.

FIGS. 2, 3, 4 and 5 show one embodiment of a female coupler part incorporating this invention. In this embodiment the coupler body 13 is again set up for a hose connection, as at 4. The female coupler also includes levers 7, rotatable in the direction A about the pivot pins 11, which pass through the carriers 14 and a seal 12. As shown in FIGS. 2 and 3, the levers 7 are in the locked position, so that the cams 8 extend into the bore 10 of the coupler. The open end of the coupler 13 carries a rotatable cap 15. The skirt 17 of the cap 15 includes slots 16 which, as is shown in FIG. 4, are in registration with the levers 7. With the cap in the "open" position as shown in FIG. 4, the levers 7 can be rotated about the pins 11 in the direction A to open the coupling. When the cap is rotated to its "closed" position, as shown in FIGS. 2 and 3, the slots 16 are moved away from the levers 7, thus bringing a portion of the skirt 17 as at 17A over the ends of the levers 7 which prevents them being moved in the direction A. The coupling is now positively locked into the closed position.

Although the cap 15 can be rotated, it is retained on the end of the body of the coupler 2. In this embodiment, the retaining means comprises a wire 18 inserted into a pair of cooperating grooves 19, 20 in the inner face and the outer face 22 (see FIG. 5) of the coupler. The wire is inserted through a suitable hole (not shown) closed by the plug 23.

Figure 5:
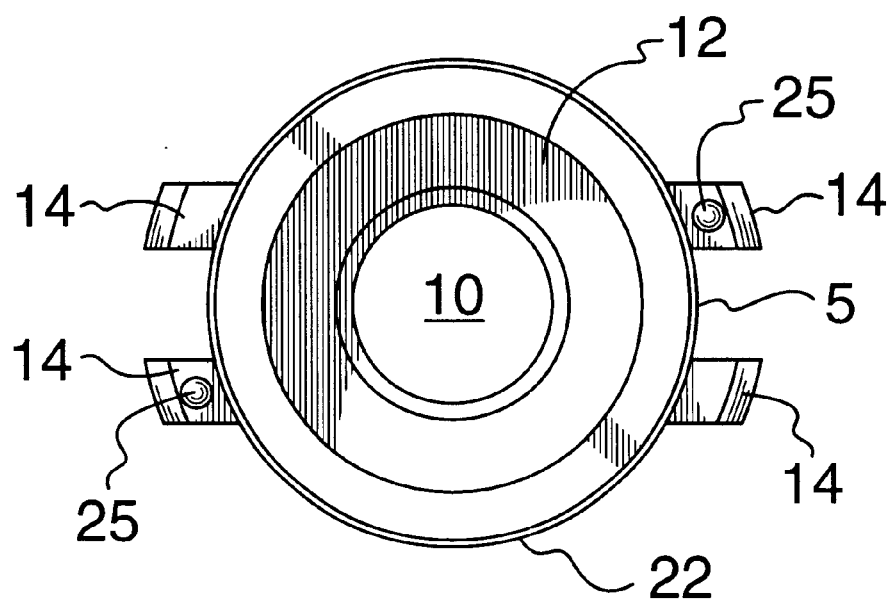
FIG. 5 shows the end of the coupler of FIG. 2 with the cap removed.

The cap is retained in its closed position by a detent means. In this embodiment a conventional spring loaded ball detent 25 is used, a detent being provided adjacent each lever 7 in two of the carriers 14, as shown in FIG. 5. The sprung ball lodges in a small depression 26 made in the adjacent inner face of the cap 15 when the cap is in its "closed" position; an equivalent depression (not shown) is also provided into which the ball lodges in the cap "open" position. Other suitable detent means could also be used.

A further advantage of this invention can also be seen from FIG. 4. Since it is only necessary that the cap skirt cover the "locked" levers, only a small amount of rotation is needed for the cap: in a typical QCD coupling for a 2.5 cm hose this is about 25°. It is also contemplated that the inner face of the cap and the outer face of the coupler inside the cap include paired stops, to limit suitably the rotation of the cap.

In the preceding discussion, it is assumed that the coupler is used to connect together two fluid conduits, typically a pipe and a hose. It is known in this art for such a coupling to be used as a sealing means, in which case either the male adapter or the female coupler are fabricated without a through passage, and instead are blanked off. Alternatively, a threaded sealing plug can be used to blank off either a male adapter or a female coupler which is provided with a threaded hole to receive a suitable conduit. This invention is equally applicable to a coupling which does not have a through passage and is intended to be used as a sealing cover.

What is claimed is:

1. A female coupler for a quick connect/disconnect coupling comprising in combination:

a female coupler comprising a body member having a bore for receiving the outer end portion of the male adapter, and a seal constructed and arranged to seal with the sealing surface of the male adapter;

a lever locking mechanism carried by the female coupler comprising a plurality of locking levers pivotally mounted onto the outside of the female coupler, each lever being rotatable between a "closed" position, and an "open position; a cam member attached to or forming part of each lever extendable on rotation of each lever about its pivot toward its "closed" position through a corresponding slot in the female coupler body into the bore of the female coupler, the cam members being constructed and arranged to engage with a cooperating arcuate groove on a male adapter constructed and arranged to be connected to a second fluid conduit entered into the bore of the female coupler on rotation of the levers toward their "closed" position;

a cap member rotatably attached to the female coupler adjacent the opening of the bore, the cap member having a skirt which extends along the outside of the female coupling to a point adjacent the lever pivots, and being rotatable on the female coupling between a "closed" position, and an "open" position;

a plurality of slots in the skirt of the cap in registration with the levers; and at least one detent means interposed between the cap and the female coupler constructed and arranged to retain the cap in its "closed" position;

wherein when the cap is in its "open" position the levers can be moved into the cap slots to their "open" positions, and when all the levers are rotated to their "closed" positions, the cap can be rotated about the female coupling to its "closed" position.

2. A coupling according to claim 1 further including at least one detent means interposed between the cap and the female coupler constructed and arranged to retain the cap in its "open" position.

3. A coupling according to claim 1 including at least one detent means interposed between the cap and the female coupler constructed and arranged to retain the cap in both its "open" position and its "closed" position.

4. A coupling according to claim 1 wherein the detent means comprises at least one spring loaded ball carried by the coupler, which enters into a suitably located depression in the cap when the cap is rotated to its "closed" position.

5. A coupling according to claim 3 wherein the detent means comprises at least one spring loaded ball carried by the coupler, which enters into a first suitably located depression in the cap when the cap is rotated to its "closed" position, and into a second suitably located depression when the cap is rotated into its "open" position.

6. A coupling according to claim 1 wherein a detent means is located on the coupler adjacent at least one lever.

7. A coupling according to claim 3 wherein a detent means is located on the coupler adjacent at least one lever.

8. A coupling according to claim 1 wherein a detent means is located on the coupler adjacent each lever.

9. A coupling according to claim 3 wherein a detent means is located on the coupler adjacent each lever.

10. A coupling according to claim 1 wherein the cap is rotatably retained on the coupler by means of a captive wire inserted into cooperating grooves in a face on the cap adjacent a cooperating face on the body of the coupling.

11. A coupling according to claim 1 wherein the female coupler is constructed and arranged to comprise a sealing cover.

12. A coupling according to claim 1 wherein the female coupler is constructed and arranged to be connected to a first fluid conduit.

13. A coupling according to claim 1 wherein the male adapter constructed and arranged to comprise a sealing cover.

14. A coupling according to claim 1 wherein the male adapter constructed and arranged to be connected to a second fluid conduit.

* * * * *